(12) United States Patent
Kirchhoff et al.

(10) Patent No.: US 11,489,178 B2
(45) Date of Patent: Nov. 1, 2022

(54) METHOD FOR DETERMINING THE STARTING STATE OF A FUEL CELL SYSTEM

(71) Applicants: AUDI AG, Ingolstadt (DE); VOLKSWAGEN AG, Wolfsburg (DE)

(72) Inventors: Maren Ramona Kirchhoff, Braunschweig (DE); Christian Schröder, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/964,526

(22) PCT Filed: Jan. 23, 2019

(86) PCT No.: PCT/EP2019/051562
§ 371 (c)(1),
(2) Date: Jul. 23, 2020

(87) PCT Pub. No.: WO2019/145324
PCT Pub. Date: Aug. 1, 2019

(65) Prior Publication Data
US 2021/0036347 A1 Feb. 4, 2021

(30) Foreign Application Priority Data
Jan. 24, 2018 (DE) ..................... 10 2018 201 103.6

(51) Int. Cl.
*H01M 8/04225* (2016.01)
*H01M 8/04089* (2016.01)
*H01M 8/04537* (2016.01)
*H01M 8/1004* (2016.01)

(52) U.S. Cl.
CPC ... *H01M 8/04225* (2016.02); *H01M 8/04089* (2013.01); *H01M 8/04559* (2013.01); *H01M 8/1004* (2013.01)

(58) Field of Classification Search
None
See application file for complete search history.

(56) References Cited

U.S. PATENT DOCUMENTS

2002/0053896 A1* 5/2002 Adams ................. H02J 7/0022
320/121
2007/0122668 A1* 5/2007 Suzuki ............. H01M 8/04228
429/429
2010/0261080 A1 10/2010 Kanie

FOREIGN PATENT DOCUMENTS

| DE | 11 2004 002 279 T5 | 9/2006 |
|---|---|---|
| DE | 11 2010 004 954 T5 | 3/2013 |
| DE | 10 2014 216 856 A1 | 2/2016 |
| DE | 10 2014 224 135 A1 | 6/2016 |

(Continued)

*Primary Examiner* — Haroon S. Sheikh
(74) *Attorney, Agent, or Firm* — Seed Intellectual Property Law Group LLP

(57) ABSTRACT

A method for determining the starting state of a fuel-cell system is provided having cathode and anode chambers separated by a membrane-electrode assembly, comprising the steps of initially introducing hydrogen into the anode chamber, measuring the voltage and evaluating whether at least a threshold value has been reached immediately after the start of the introduction of hydrogen into the anode chamber, and determining the starting state as a function of whether the threshold value has been reached.

19 Claims, 2 Drawing Sheets

(56) References Cited

FOREIGN PATENT DOCUMENTS

DE      10 2015 210 836 A1     12/2016
JP        2005-158557 A      6/2005

\* cited by examiner

METHOD FOR DETERMINING THE STARTING STATE OF A FUEL CELL SYSTEM

BACKGROUND

Technical Field

Embodiments of the invention are formed by a method for determining the starting state of a fuel-cell system having cathode and anode chambers separated by a membrane-electrode assembly (MEA), comprising the steps of initially introducing hydrogen into the anode chamber, measuring the voltage and evaluating whether at least a threshold value has been reached immediately after the start of the introduction of hydrogen into the anode chamber, and determining the starting state as a function of whether the threshold value has been reached.

Description of the Related Art

Various damage mechanisms are known from the prior art which can impair fuel-cell systems, wherein the damage mechanisms may become effective in different operating states. After a fuel-cell system has been shut down and switched off, the fuel-cell systems can remain in this state for different periods of time, so that the starting conditions can significantly vary at the start of the fuel-cell system. In the prior art, a distinction is made between an $H_2/H_2$ state, in which hydrogen is present both in the cathode chamber and in the anode chamber. There is also the possibility of providing the air/air state, in which air, and thus oxygen, are present in the cathode and anode chambers, wherein intermediate states are also possible in which different concentrations of hydrogen or air are provided.

DE 10 2014 224 135 A1 discloses a method which monitors the voltage at shutdown and derives the oxygen content therefrom in order to avoid a harmful air/air start during restarting.

DE 11 2010 004 954 T5 discloses the arrangement of a selectively-conductive component in the MEA, to prevent high cathode potentials when air is present at the anode upon startup.

It is also known to which state the differently acting damage mechanisms are related, wherein damage that has occurred can be regenerated or at least reduced by suitable reconditioning cycles. It is therefore important to know which damage mechanisms are effective, in order to be able to take suitable countermeasures, since a diagnosis of the frequency of certain conditions can be used to predict reversible damage, with the resulting possibility of introducing suitable reconditioning measures.

BRIEF SUMMARY

An aim of embodiments of the invention is therefore to provide a method by which the starting state of a fuel-cell system can be determined.

This aim is achieved by a method in which a reliable differentiation of the different starting states is possible by measuring a parameter, viz, the voltage of the fuel cell(s), which, for detecting the operating state of the fuel-cell system, is generally detected anyway by means of suitable sensors.

The threshold value can, in particular, be evaluated as to whether the threshold value has been reached and exceeded or whether the threshold value has not been reached. If the fuel-cell system is in the $H_2/H_2$ state, and, at the start of the fuel-cell system, hydrogen is introduced into the anode chamber, the $H_2/H_2$ state is not modified, since it is still the case that hydrogen is present both in the cathode chamber and in the anode chamber. There is thus no voltage build-up in the fuel-cell system.

In this case, "immediately" is to be understood as meaning a sufficiently short time span, which may last less than five seconds or less than one second—and can therefore lie in the millisecond range.

The conditions are different in the air/air state, since air and thus oxygen are available in the cathode chamber, and hydrogen is introduced into the anode chamber, so that a build-up of rapid voltage up to the open circuit voltage of the fuel-cell system can be established immediately. The use of a single threshold value is thus sufficient for being able to distinguish with certainty between the two states.

In some embodiments of the invention, it is preferred to work with several threshold values for more precise characterization of the starting state, wherein a low threshold value is assigned to the $H_2/H_2$ starting state, a high threshold value is assigned to the air/air starting state, and at least one further threshold value is assigned to an intermediate starting state. In some embodiments of the invention, it is thus also possible not only to differentiate reliably between the two extreme states, but also to determine starting states in which deviating instances of the extreme states are present. It should be pointed out that a suitable number of threshold values can also be used to distinguish between the different intermediate starting states.

In some embodiments of the invention, it is also possible for the temporal voltage build-up to be detected and, with respect to the temporal gradient $dU/dt$, after the initial introduction of hydrogen into the anode chamber, evaluated in order to determine the starting state as a function of whether at least one threshold value has been reached.

This is because differences in the starting states manifest not only in the magnitude of the voltage after the initial introduction of the hydrogen, but also with respect to the temporal development of the voltage profile.

In this case, it is provided that a flat gradient be assigned to the $H_2/H_2$ starting state, that a steep gradient be assigned to the air/air starting state, and that a gradient lying between these extreme values be assigned to the intermediate starting state.

Different system configurations result in the possibility of adaptations and extensions of the method. It is thus possible that, given a gas-tight blocking of the anode and cathode chambers, the temporal voltage profile is detected and, with respect to the temporal gradient $dU/dt$, after the start of the air supply, evaluated in order to determine the starting state. In this case, use is made of the fact that a characteristic voltage profile occurs for the respective starting state not only when hydrogen is introduced initially, but also at the start of the air supply, when air is introduced into the cathode chamber.

It is also possible that, in the absence of gas-tight blocking of the anode and cathode chambers, the period between the initial introduction of hydrogen into the anode chamber and the start of the air supply is detected in order to determine the starting state as a function of whether a threshold value has been reached.

In some embodiments of the invention, the fuel-cell system comprises a plurality of membrane-electrode assemblies arranged in a stack, and for the threshold values to be determined as a function of the stack voltage. Modern fuel-cell systems generally consist of a plurality of membrane-electrode assemblies combined in a stack, so that it is not expedient, with respect to the threshold values, to pre-define fixed voltage values for any desired fuel-cell systems, wherein, however, by means of relative information with respect to the threshold values, consideration of different numbers of membrane-electrode assemblies can be taken into account.

A further extension of the method results from a measurement of the hydrogen concentration in the cathode exhaust gas being carried out, and the time profile being evaluated with respect to the concentration gradient and/or whether a threshold value has been reached for determining the starting state.

The method steps carried out thus far serve to collect information about the starting state of a fuel-cell system, but it is expedient to evaluate the collected information in such a way that the frequency of the individual starting states is detected and supplied to a diagnostic system, wherein a prediction of reversible damage takes place further on the basis of the data acquired by the diagnostic system, and, possibly, a regeneration process is initiated.

DETAILED DESCRIPTION

Figure 1:
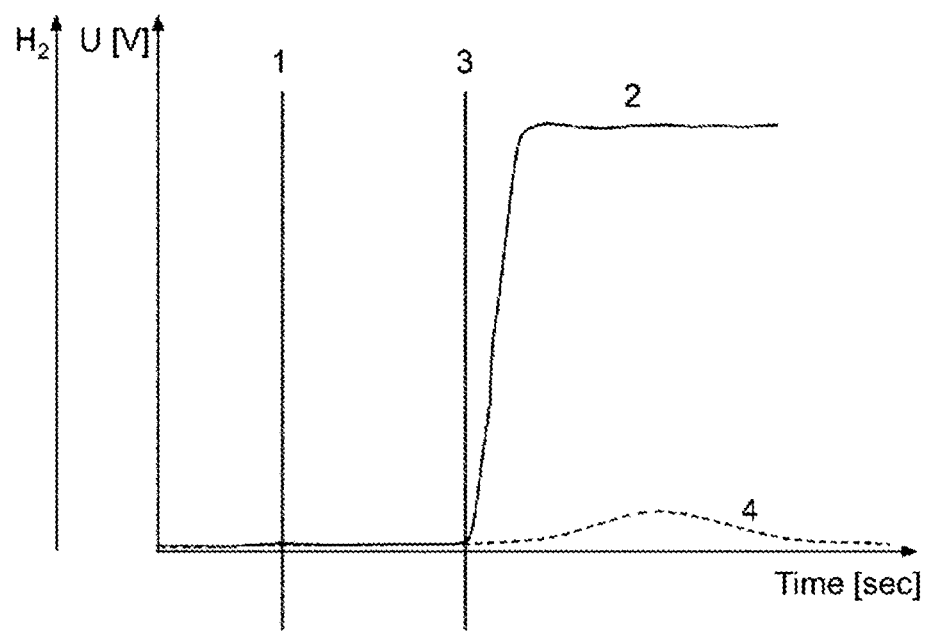
FIG. 1 illustrates a graph showing the time axis as an abscissa of the profile of the voltage and the hydrogen concentration in the cathode exhaust gas, starting from an $H_2/H_2$ state.

In a fuel-cell system, after a shutdown, different states can be present when it is started again, wherein it is assumed with respect to FIG. 1 that hydrogen is present ($H_2/H_2$ state) in the cathode chamber as well as in the anode chamber. If hydrogen is now introduced into the anode chamber for the start of the fuel-cell system at time 1, there is no voltage build-up due to the lack of oxygen in the cathode chamber, so that the represented voltage build-up 2 results.

Figure 2:
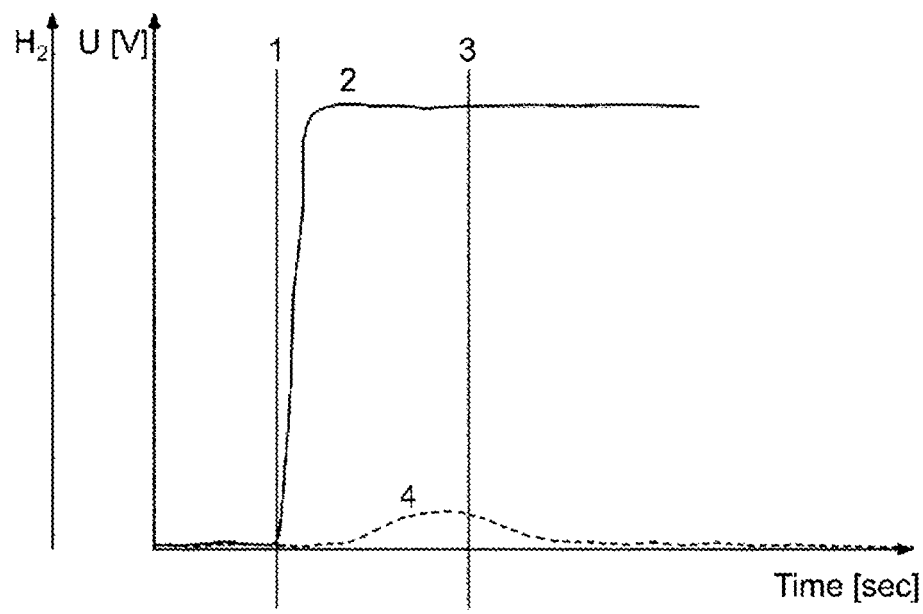
FIG. 2 illustrates a diagram corresponding to FIG. 1, starting from an air/air state.

FIG. 2 assumes the air/air starting state in which air and thus oxygen are present both in the anode chamber and in the cathode chamber, so that, upon initial introduction of hydrogen at time 1 into the anode chamber, the reaction typical of a fuel-cell system can take place, and a voltage build-up 2 results very quickly up to the open circuit voltage of the fuel-cell system.

With reference to the illustrations in FIGS. 1 and 2, it is thus easily recognizable to a person skilled in the art how to select suitable threshold values so as to be able to reliably distinguish between the $H_2/H_2$ starting state and the air/air starting state, since, in principle, any threshold value is suitable between the voltage at time 1 after the introduction of hydrogen in FIG. 1 and at time 1 after the introduction of hydrogen in FIG. 2.

However, intermediate states with different characteristics of the starting states underlying FIGS. 1 and 2 can also be given, in which different concentrations of hydrogen or oxygen are present in the anode and cathode chambers.

Figure 3:
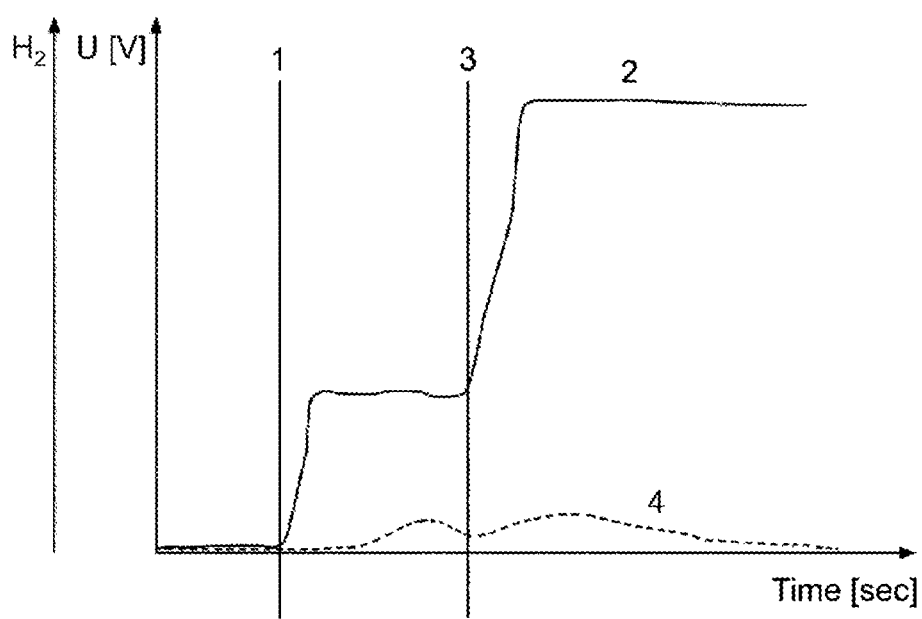
FIG. 3 illustrates a diagram corresponding to FIG. 1, starting from an intermediate state.

In these intermediate states, after the initial introduction of hydrogen into the anode chamber, a relatively rapid voltage build-up 2 results, which, however, does not reach the open circuit voltage of the fuel-cell system, so that the corresponding selection of suitable threshold values allows a reliable differentiation between the three states from FIGS. 1, 2, and 3.

It is pointed out only for the sake of completeness that further threshold values can be used in order to distinguish different intermediate states with varying concentration ratios in the anode and cathode chambers.

The graphs in FIGS. 1 through 3 furthermore show that not only the absolute values of the voltage are suitable for differentiating the starting states, but that the time profile also differs, so that the evaluation of the gradients of the voltage build-up 2 provides a further possibility for distinguishing between the starting states. FIGS. 1 through 3 furthermore show the start of the air supply at time 3 for the cathode chamber, wherein the air supply again has significantly different effects on the voltage build-up 2, depending upon the presence of the starting state.

In the $H_2/H_2$ starting state shown in FIG. 1, no air is available in the case of a gas-tight blocking of the anode and cathode chamber in the cathode chamber itself, and thus, after the start of the air supply at time 3, the fuel-cell system can transition into normal operation, and the voltage build-up 2 can be realized up to the open circuit voltage.

In the air/air state shown in FIG. 2, the start of the air supply at time 3 has no comparably great effect on the voltage build-up 2. It can be seen, however, that the hydrogen concentration 4 represented by the dashed line changes significantly in the cathode exhaust gas, so that this parameter can also be evaluated with respect to its time profile in order to differentiate between the individual starting states.

Of course, it is also possible to combine the possible evaluation methods and thus to achieve a higher reliability, since the evaluation methods are based in each case on different parameters as threshold values.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining a starting state of a fuel-cell system having cathode and anode chambers separated by a membrane-electrode assembly, comprising:
   initially introducing hydrogen into the anode chamber;
   measuring a resulting voltage;
   evaluating whether at least a threshold value for the resulting voltage has been reached immediately after the start of the introduction of hydrogen into the anode chamber; and
   determining the starting state as a function of whether the threshold value has been reached, and
   wherein a low threshold value is assigned to an $H_2/H_2$ starting state, in which hydrogen is present in both the anode chamber and the cathode chamber, and a high threshold value is assigned to an air/air starting state, in which air is present in both the anode chamber and the cathode chamber.

2. The method according to claim 1, wherein a temporal voltage build-up is detected and, with respect to a temporal gradient $dU/dt$ of the temporal voltage build-up, after the initial introduction of hydrogen into the anode chamber, evaluated in order to determine the starting state as a function of whether at least one threshold value for the temporal gradient has been reached.

3. The method according to claim 2, wherein a flat gradient is assigned to the $H_2/H_2$ starting state and a steep gradient is assigned to the air/air starting state.

4. The method according to claim 2 wherein there is a gas-tight blocking of the anode and cathode chambers.

5. The method according to claim 1, wherein, in the absence of gas-tight blocking of the anode and cathode chambers, a period between the initial introduction of hydrogen into the anode chamber and a start of an air supply is detected in order to determine the starting state as a function of whether a threshold value for the period has been reached.

6. The method according to claim 1, wherein the fuel-cell system has a plurality of membrane-electrode assemblies arranged in a stack, and the threshold value is determined as a function of a stack voltage.

7. The method according to claim 1, wherein a measurement of a hydrogen concentration is carried out in the cathode exhaust gas, and a temporal profile is evaluated with respect to a concentration gradient of the hydrogen concentration in the cathode exhaust gas.

8. The method according to claim 1, wherein a frequency of individual starting states is detected and supplied to a diagnostic system.

9. The method according to claim 8, wherein a prediction of reversible damage takes place on the basis of the data acquired by the diagnostic system.

10. A method for determining a starting state of a fuel-cell system having cathode and anode chambers separated by a membrane-electrode assembly, comprising:
   initially introducing hydrogen into the anode chamber;
   measuring a resulting voltage;
   evaluating whether at least a threshold value for the resulting voltage has been reached immediately after the start of the introduction of hydrogen into the anode chamber; and
   determining the starting state as a function of whether the threshold value has been reached, and
   wherein a temporal voltage build-up is detected and, with respect to a temporal gradient dU/dt of the temporal voltage build-up, after the initial introduction of hydrogen into the anode chamber, evaluated in order to determine the starting state as a function of whether at least one threshold value for the temporal gradient has been reached;
   wherein a flat gradient is assigned to an $H_2/H_2$ starting state, in which hydrogen is present in both the anode chamber and the cathode chamber, and a steep gradient is assigned to an air/air starting state, in which air is present in both the anode chamber and the cathode chamber.

11. The method according to claim 10 wherein there is a gas-tight blocking of the anode and cathode chambers.

12. The method according to claim 10, wherein, in the absence of gas-tight blocking of the anode and cathode chambers, a period between the initial introduction of hydrogen into the anode chamber and a start of an air supply is detected in order to determine the starting state as a function of whether a threshold value for the period has been reached.

13. The method according to claim 10, wherein the fuel-cell system has a plurality of membrane-electrode assemblies arranged in a stack, and the threshold value is determined as a function of a stack voltage.

14. The method according to claim 10, wherein a measurement of a hydrogen concentration is carried out in the cathode exhaust gas, and a temporal profile is evaluated with respect to a concentration gradient of the hydrogen concentration in the cathode exhaust gas.

15. The method according to claim 10, wherein a frequency of individual starting states is detected and supplied to a diagnostic system.

16. A method for determining a starting state of a fuel-cell system having cathode and anode chambers separated by a membrane-electrode assembly, comprising:
   initially introducing hydrogen into the anode chamber;
   measuring a resulting voltage;
   evaluating whether at least a threshold value for the resulting voltage has been reached immediately after the start of the introduction of hydrogen into the anode chamber; and
   determining the starting state as a function of whether the threshold value has been reached, and
   wherein a measurement of a hydrogen concentration is carried out in the cathode exhaust gas, and a temporal profile is evaluated with respect to a concentration gradient of the hydrogen concentration in the cathode exhaust gas.

17. The method according to claim 16, wherein, in the absence of gas-tight blocking of the anode and cathode chambers, a period between the initial introduction of hydrogen into the anode chamber and a start of an air supply is detected in order to determine the starting state as a function of whether a threshold value for the period has been reached.

18. The method according to claim 16, wherein the fuel-cell system has a plurality of membrane-electrode assemblies arranged in a stack, and the threshold value is determined as a function of a stack voltage.

19. The method according to claim 16, wherein a frequency of individual starting states is detected and supplied to a diagnostic system.

* * * * *